US008814249B2

(12) United States Patent
Rossi

(10) Patent No.: US 8,814,249 B2
(45) Date of Patent: Aug. 26, 2014

(54) SYSTEM FOR SECURING A TRUCK BED COVER

(71) Applicant: Steven Rossi, Pickering (CA)

(72) Inventor: Steven Rossi, Pickering (CA)

( * ) Notice: Subject to any disclaimer, the term of this patent is extended or adjusted under 35 U.S.C. 154(b) by 0 days.

(21) Appl. No.: 13/662,157

(22) Filed: Oct. 26, 2012

(65) Prior Publication Data

US 2014/0117702 A1 May 1, 2014

(51) Int. Cl.
*B60P 7/02* (2006.01)

(52) U.S. Cl.
USPC ............. 296/100.14; 296/100.16; 296/100.18

(58) Field of Classification Search
USPC ............. 296/100.01, 100.02, 100.06–100.09, 296/100.12, 100.14, 100.16, 100.18, 98
See application file for complete search history.

(56) References Cited

U.S. PATENT DOCUMENTS

| | | | | |
|---|---|---|---|---|
| 5,480,206 A | * | 1/1996 | Hathaway et al. | 296/36 |
| 5,595,417 A | * | 1/1997 | Thoman et al. | 296/100.09 |
| 6,607,234 B1 | * | 8/2003 | Schmeichel | 296/100.16 |
| 7,040,675 B1 | * | 5/2006 | Ott et al. | 292/216 |
| 7,052,071 B2 | * | 5/2006 | Mulder et al. | 296/100.07 |
| 7,188,888 B2 | * | 3/2007 | Wheatley et al. | 296/100.04 |
| 7,334,830 B2 | * | 2/2008 | Weldy | 296/100.09 |
| 7,384,090 B1 | * | 6/2008 | Weldy | 296/100.16 |
| 7,905,536 B2 | * | 3/2011 | Yue | 296/100.07 |
| 8,262,148 B2 | * | 9/2012 | Rusher et al. | 296/100.06 |
| 8,480,154 B2 | * | 7/2013 | Yue | 296/100.07 |
| 2005/0264024 A1 | * | 12/2005 | Mulder et al. | 296/100.07 |
| 2007/0024079 A1 | * | 2/2007 | Wheatley | 296/100.16 |
| 2007/0108792 A1 | * | 5/2007 | Weldy | 296/100.09 |
| 2007/0205629 A1 | * | 9/2007 | Wheatley | 296/100.18 |
| 2010/0270824 A1 | * | 10/2010 | Yue | 296/100.07 |
| 2011/0101727 A1 | * | 5/2011 | Rusher et al. | 296/100.18 |

* cited by examiner

*Primary Examiner* — Glenn Dayoan
*Assistant Examiner* — Gregory Blankenship
(74) *Attorney, Agent, or Firm* — Nasser Ashgriz

(57) ABSTRACT

A tri folding tonneau cover having multiplicity of cross beams, a soft cover extending over the frame, a set of adjustable front locking system attached onto the two ends of a cross-beam located close to the front side of the frame, and a set of rear latching mechanism. The rear latching mechanism comprising of a set of latches, cables, guiding spools and a cable handle. Each cable can release one latch and all cables are connected to the cable handle through the guiding spools. Therefore, all latched can be released at the same time with pulling onto the cable handle.

5 Claims, 8 Drawing Sheets

SYSTEM FOR SECURING A TRUCK BED COVER

FIELD OF THE INVENTION

The present invention relates to a new latch and latch releasing mechanism for the soft cover tonneau covers.

BACKGROUND AND SUMMARY OF THE INVENTION

Tonneau covers are used to cover the open cargo bed of pickup trucks and protect the material inside the cargo bed from weather conditions, theft and vandalisms. In addition, tonneau covers improve vehicle fuel economy. Tonneau covers are generally designed to lie flat and flush with the top walls of the cargo bed of the truck. Therefore, a covered bed results in a more aerodynamic flow around the truck, reducing the drag force on the truck and thus, a better fuel efficiency.

Tonneau covers can be hard cover or soft cover. Hard tonneau covers are made of rigid material, like metal or fiberglass, whereas, soft covers are made of flexible material, like vinyl or cloth. The cover has to be water resistant and durable. It can be either a single cut piece or in multiple pieces. The single cut piece provides a better cargo protection compared to multi piece unit, which may have leakage in the rain.

To provide security as well as preventing vibration of the cover during vehicle travel, the cover has to be tightly connected to the truck bed. This is usually achieved by some type of a clamp or latch system that is installed on the cover and is locked onto the bed walls. One of the major issues with hard tonneau covers is that rails and tubes may have to be added to the truck bed. In many cases, holes may have to be drilled on the truck bed. These mechanism may result in rusting of the drilled sections and disrupt the original look of the truck.

In order to eliminate the above mentioned problems, several different clamp down covers have been introduced. Examples of clamp systems can be found in U.S. Pat. No. 129,077 to Weldy and U.S. Pat. No. 8,146,982 to Williamson. However, these securing systems are relatively complex and costly to manufacture. The user must know the configuration of the pickup truck wall. Both Opening and closing steps of these clamp systems are difficult and time consuming. Each side should be opened and closed separately, which is a big negative point for the system especially in the bad weather conditions.

Currently, there is a need for more simple and customized securing system. Furthermore, the diversity of cargo bed construction and wall configurations require specific clamps for each specific model of pick-up truck. The present invention improves the conventional locking and securing of tonneau covers.

SUMMARY OF THE INVENTION

The present invention introduces a novel clamping and releasing mechanism for tonneau covers. The new locking system is unique in both operation and design providing a wide range of functionality for the system. The cover is secured onto the bed by only four connectors: Two at the front and two at the rear of the truck bed. The two at the front, with one on each side of the truck, are adjustable clamps that tightly attach to the bed railing. A latching system is installed at the rear side of the cover, which facilitates one step opening of the tonneau cover and a single downward push to close the cover. The latching system comprises of a cable that can open the latch by pulling onto the cable. In order to facilitate a one-step opening of the cover, cables connected to the latches on both sides of the cover are guided with a set of pulleys to the central rear section of the cover, and are connected to a cable handle. The cable handle is conveniently positioned next to the tail gate of the truck bed. Therefore, the cover can be easily opened by opening the tail gate and pulling onto the cable handle, which releases the latches on both sides of the cover. The present invention can be easily used for any type of pickup truck beds. The locking system can also be equipped by an actuator and a remote control for more convenient usage. Once activated, the actuator can pull the cable and open the tonneau cover remotely. Therefore, the present tonneau cover is aimed at providing the following objectives.

The first object of the present invention is to provide a tonneau cover with simple locking system. This is achieved by having a push down latching system. The cover is set on the truck bed and it is locked in place by simply pushing the cover down.

The second object of the present invention is to provide a tonneau cover that can be released by one action. This is achieved by a single pull releasing mechanism, which allows for a quick release of the cover.

The third object of the present invention is to provide a tonneau cover that can be released remotely. This is achieved by using a remotely controlled actuator device which pulls onto a release cable connected to a latching mechanism.

The fourth object of the present invention is to provide a tonneau cover that can be mounted on a variety of pick-up truck beds. This achieved by having adjustable latching mechanisms.

The fifth object of the present invention is to provide a tonneau cover that can be pre-assembled and installed with minimum effort. This is achieved by having easy access to the locking and latching mechanism.

The sixth object of the present tonneau cover is to provide a system that it is light weight (less than 5 lbs) and compact enough to be handled by one person. Since a pickup truck is used to carry cargo, a tonneau cover is removed and put back on regularly. It is, therefore, important to have a tonneau cover that is lightweight and can be easily installed and removed. Otherwise, the user will not regularly use the tonneau cover, increasing the chances of weather damage and vandalism. Soft tonneau covers are generally lighter than hard cover ones and are preferred by users that need to open and close the bed often. Hard tonneau covers are relatively heavy and two or more people are needed to install such covers.

The aforementioned objects of the present invention are attained by a tri folding soft tonneau cover having adjustable front clamps and push down rear latching mechanism and a single cable to pull open the latching mechanism. Other objects, advantages and novel features of the present invention will become readily apparent from the following drawings and detailed description of preferred embodiments.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
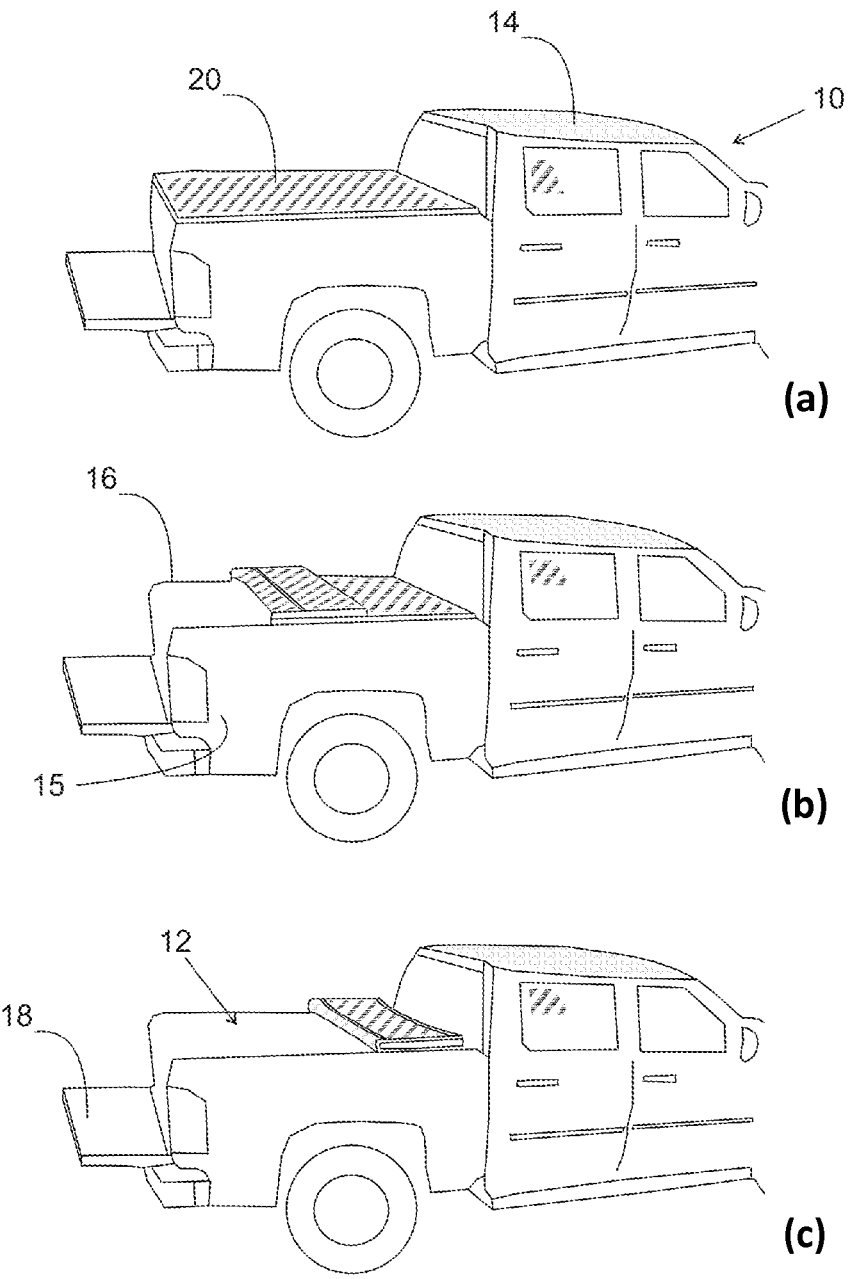
FIG. 1 shows an installed tonneau cover on a pick-up truck, with (a) showing the closed position, (b) showing one panel open, and (c) showing the folded position with two panels open.

Referring to FIG. 1, a vehicle, a pick-up truck 10, has a cargo bed 12 extended from behind a passenger cab 14. The bed includes two opposed and parallel sidewalls 15, 16 and a rear tailgate 18.

The tonneau cover having the presently disclosed latch and release mechanism is shown in FIG. 1. In one embodiment of the present invention, a soft tri-folding tonneau cover 20 is disclosed. The tonneau tarp 20 is preferably made of a UV protected, thick 25 ounce, weather tight double coated (on the top and bottom) heavy duty vinyl tarp, and has Marine grade terelyne stitching (triple layer).

Tri folding tonneau cover is made of three sections. The front section, which attaches to the front side of the bed behind the passenger compartment, the middle section and the rear section which attaches to the tail gate of the bed. The three sections have substantially the same width. The middle section has hinges on its both sides, and is connected to the front section from one side and to the rear section from the other side. Each section has two cross bars. The front section has a cross bar that lies on the front wall of the bed and a cross bar close to the end hinges on the frame. The rear section has a bar at the end of the section that lies on the top of the tailgate and a second one close to the hinges. The middle section has two cross bars each close to the hinges on the sides of the frame.

The folded cover is approximately ⅓ of the full size of the cover and can be easily stored and shipped. Once the cover is folded, three belt buckles keep the tonneau tight, to prevent vibration and movement during vehicle motion. The straps are preferably pull-to-tighten-buckle-straps, although any other type of strap can be used. Once the cover is set on the truck bed, one can release the buckles and unfold the cover on the truck bed to cover the entire bed.

Figure 2:
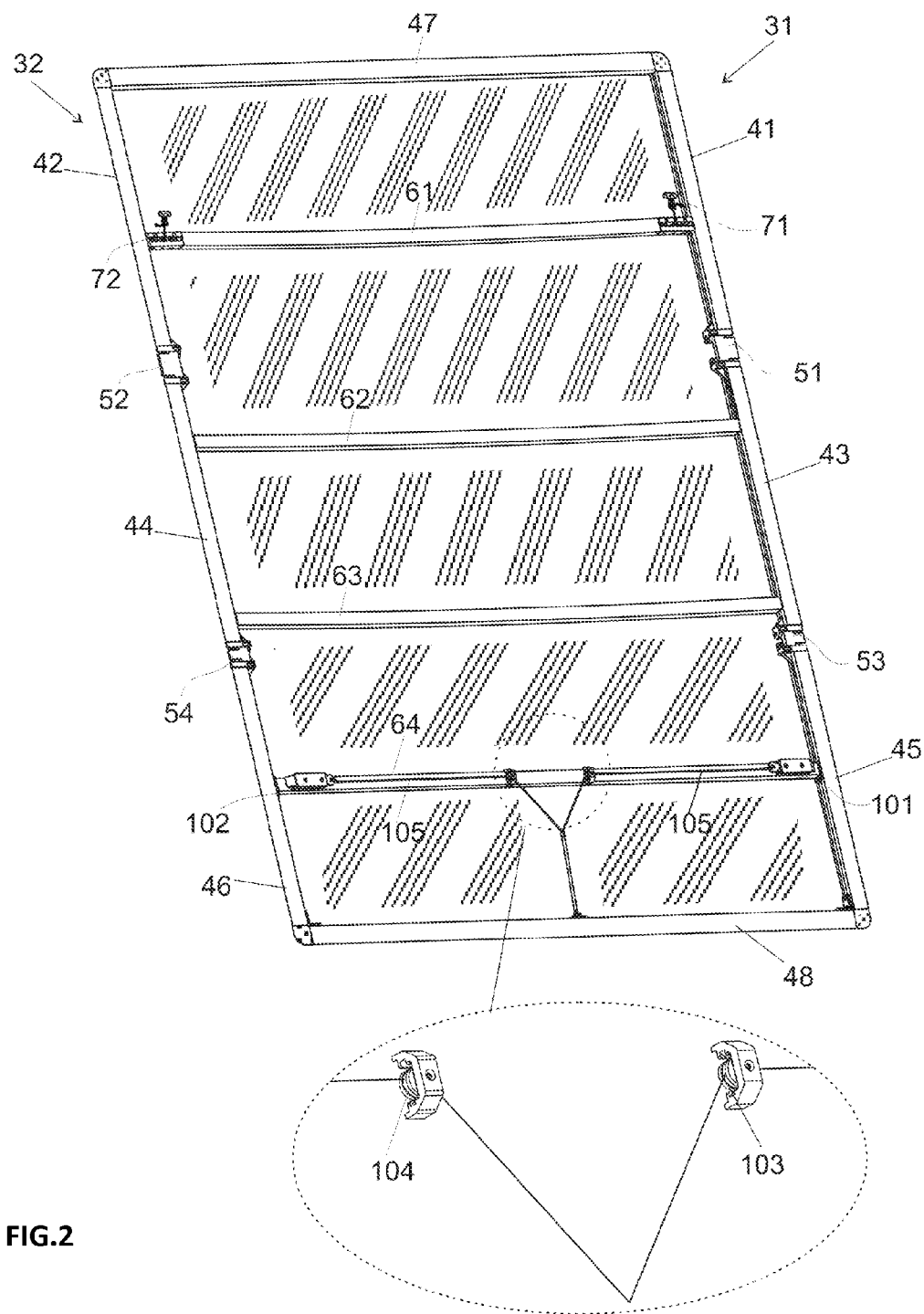
FIG. 2 shows a back plan view of a tonneau cover with the new fully assembled locking system.
Figure 3:
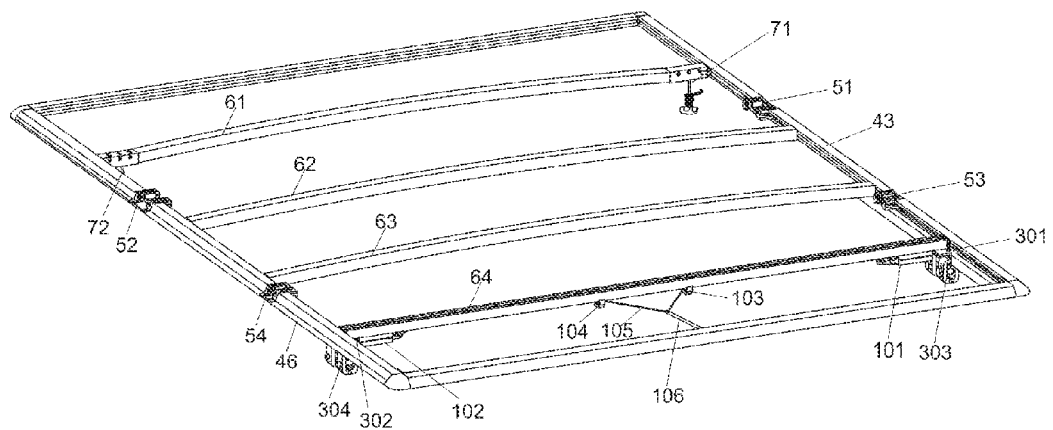
FIG. 3 shows an upper plan view of a bare tonneau cover with the new fully assembled locking system.
Figure 4:
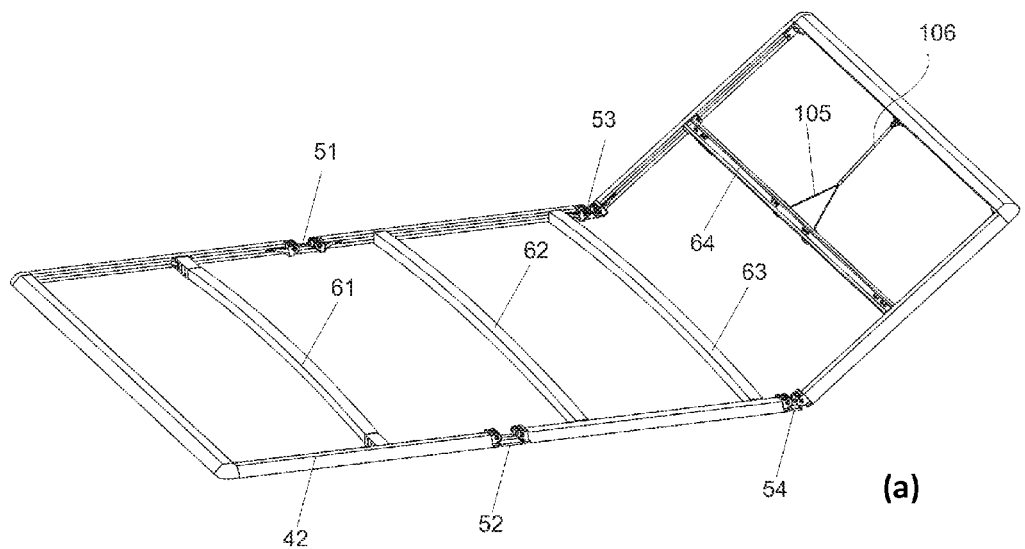
FIG. 4 shows an upper plan view of a bare tonneau cover with the new fully assembled locking system and the schematic of the folding cover.
Figure 4:
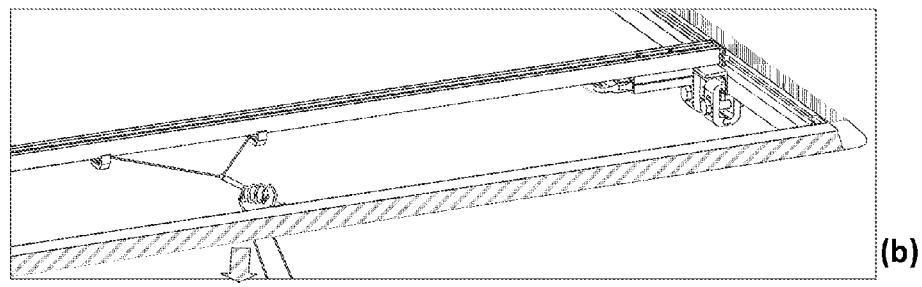

FIG. 2 illustrates the back side of the tonneau cover, which comprises of a tri folding frame holding the cover. The tri folding frame is sized to cover the open top of a bed of a pickup truck. The right 31 and the left 32 sides of the frame comprise of three equal length bars, three on the right, 41, 43, 45, and three on the left, 42, 44, 46. The tri-folding cover has four hinges, two on each side of the frame to allow for two folds, making the cover a tri-folding. Two hinges on the right, 51 and 53 connect the right sectional bars and two hinges on the left 52, 54, connect the left sectional bars. Therefore, forming a tri folding frame. In order to increase the cover's rigidity and reduce vibrations, four high strength cross bars, 61, 62, 63, and 64, are used to connect the right and left sides of the frame. The four cross bars are almost equally distanced, dividing the frame into five panels. Cross bar one 61 is close to the passenger cab and cross bar four 64 is closer to the tail gate. Cross bars two and three 62 and 63 are located in between the two hinges on both sides of the frame and connect the middle sections of the frame 43 and 44 to each other.

The bars of the frame are preferably made of coiled aluminum, however, any light weight but rigid material, such as extruded aluminum, poly-propylene laminate composite or the steel iron can also be used. The panels should be sufficiently strong and rigid to support the applied load, but light enough to allow for one person to easily handle it. These parts may also have high gloss epoxy coating for better protection and looks.

The frame is sized to fit the bed of a particular pickup truck. Since different trucks have different sizes, the tonneau cover has to be made to fit the particular size. The frame corners are reinforced and have soft pads at the edges, which prevent tonneau cover from turning. There are large Q-seals all along the bottom of the frame and even on the hinges.

Any available type of hinge mechanism, i.e., multiple hinge, piano hinge, or similar, as known to one of ordinary skill in the art can be applied for the hinges 51-54.

Figure 5:
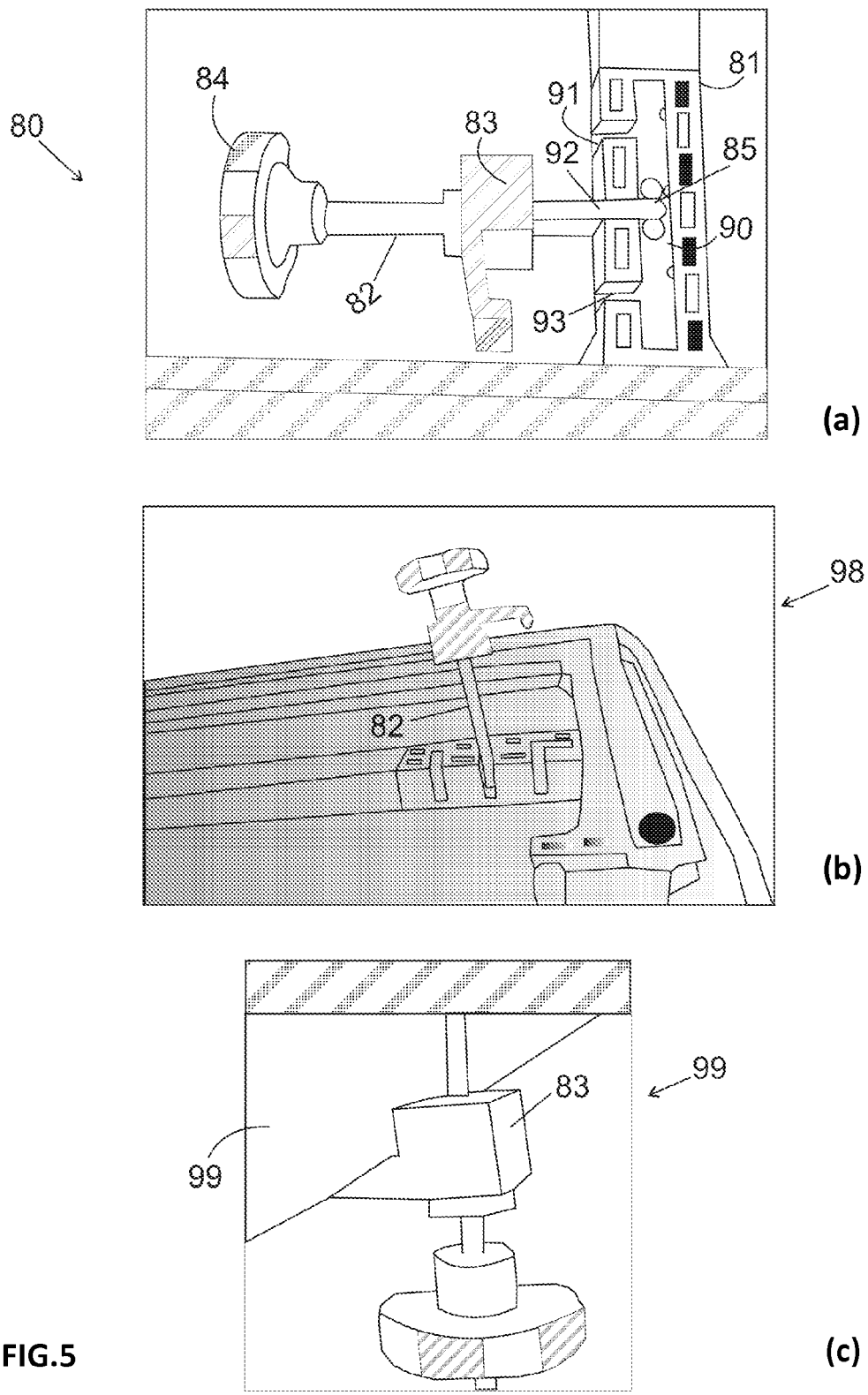
FIG. 5 shows the rear locking mechanism of the tonneau cover with (a) away position, (b) lifted position, and (c) locked position.

The front locking mechanism 71 and 72, having adjustable positioning system are shown in FIG. 5. These locks are installed on the cross bar 61 of the front section. The locking system 80 comprise of a base 81, a shank screw 82, a clamp 83, and a knob 84. Said base 71 has adjusting means to adjust the location of the clamp to fit different pickup truck bed sizes. One such means is illustrated in FIG. 5. The base 81 comprises of a channel 90 with three openings 91, 92, 93. Based on different configuration of pick-up truck bed, the distance between clamp 83 and pick-up truck wall 15, can be adjusted with channel 90. If the distance between the railing of the truck bed wall 99 and the clamp 83 is small, the opening 93 is used and if the distance between the railing of the truck bed wall 99 and the clamp 83 is large, the opening 91 is used. In many cases the opening 92 is fine for securing the tonneau cover to the pick-up truck wall. Shank screw 82 is installed inside the channel 90 at one of the openings 91, 92, or 93. A screw 85 holds the shank screw 82 in place. The shank screw can be rotated around the screw 85. The shank screw cannot be removed from the base without removing the screw 85. The clamp 83 is located under the railing of the truck bed wall 99. The knob 84 is then turned to tighten the clamp under the bed railing. When the tonneau cover is removed, the shank screw can be turned and locked inside one of the channels, 91, 92, and 93 (it is in channel 92 in FIG. 5) for away position.

Clamps are preferably made of aluminum with plastic coating. The knobs 84 are preferably large ones to make it easy to turn to tighten or loosen.

Figure 6:
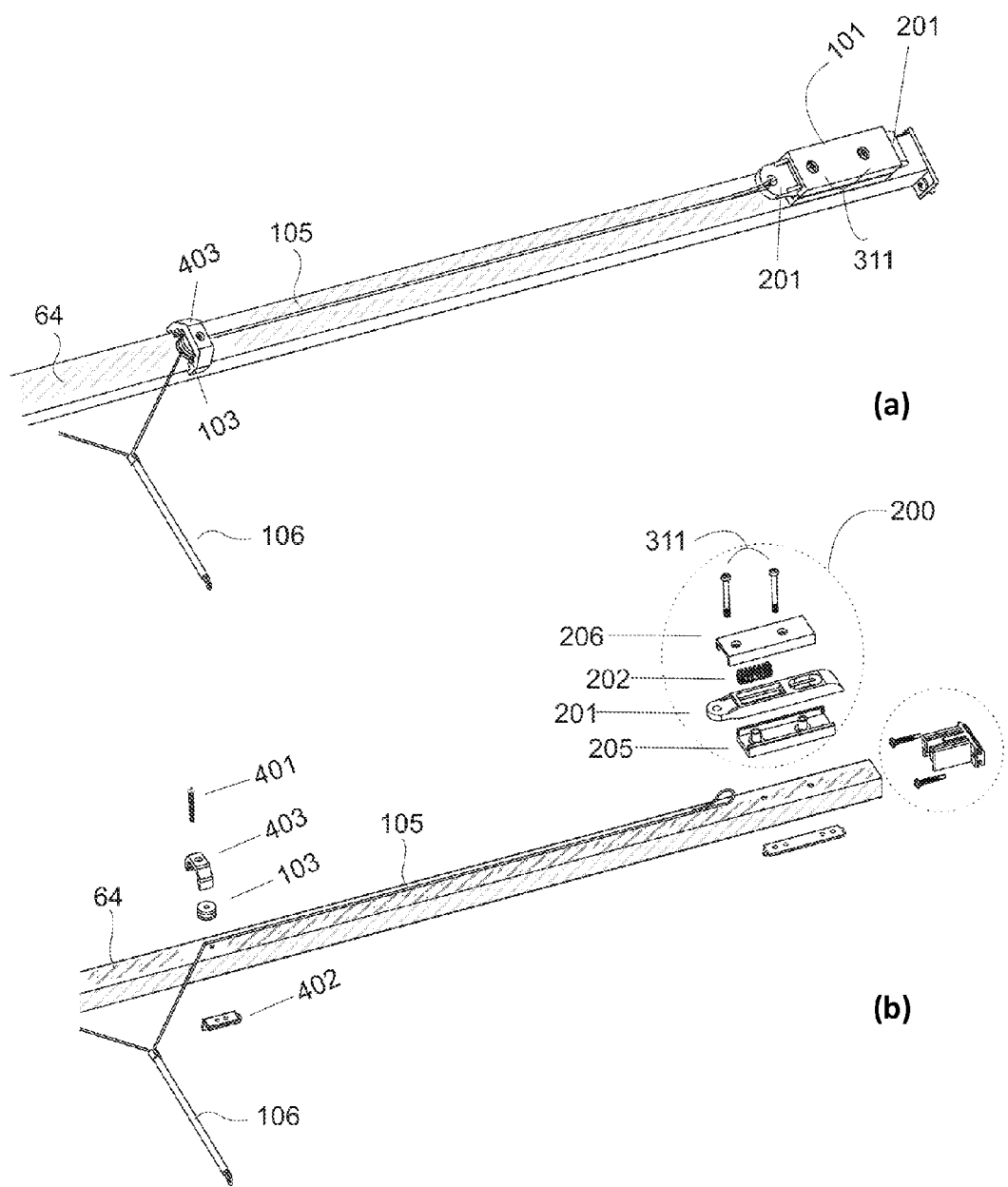
FIG. 6 shows enlarged, partial schematic view of the front locking system and cable handle.

The rear locking mechanism is designed to be opened with one pull. The complete system is a package of a latching system 101, 102, spools 103, 104, cable 105 and a cable handle 106 that helps to open and close the tonneau cover. The present system facilitates locking and opening the tonneau cover as shown in FIG. 6. The novelty of this invention compared to the previous tonneau covers is easy locking and one step opening process. In the prior art systems, the user should open and lock each side of the tonneau cover separately. The present invention is user friendly with one step opening system.

The latching mechanism (locking system), as shown in FIG. 6, includes a spring-loaded catch 201 that automatically secures the latch when it is closed. Manually pulling down a cable handle 106 releases the latching mechanism and opens the latch. The latching device 101, 102 is preferably bolted onto the forth cross bar 64.

Figure 7:
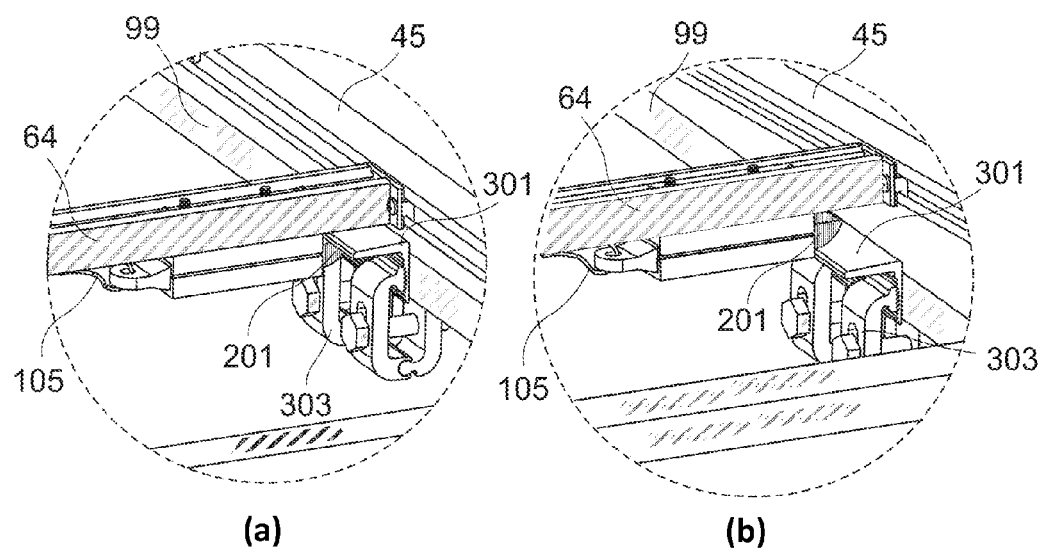
FIG. 7 shows a further enlarged, partial schematic view of the front latching system and the holding clamps.

Referring to FIGS. 6 and 7, the latching assembly 200, includes a tension spring 202 and a spring-loaded catch 201. The spring-loaded catch 201 uses the tension spring 202, to apply a force for moving the catch under a L-shaped metal bracket 301, and keeping it in that position. The L-shaped metal brackets 301, 302 are attached to the pick-up truck bed walls 15, 16 with two clamps 303, 304, respectively.

Figure 8:
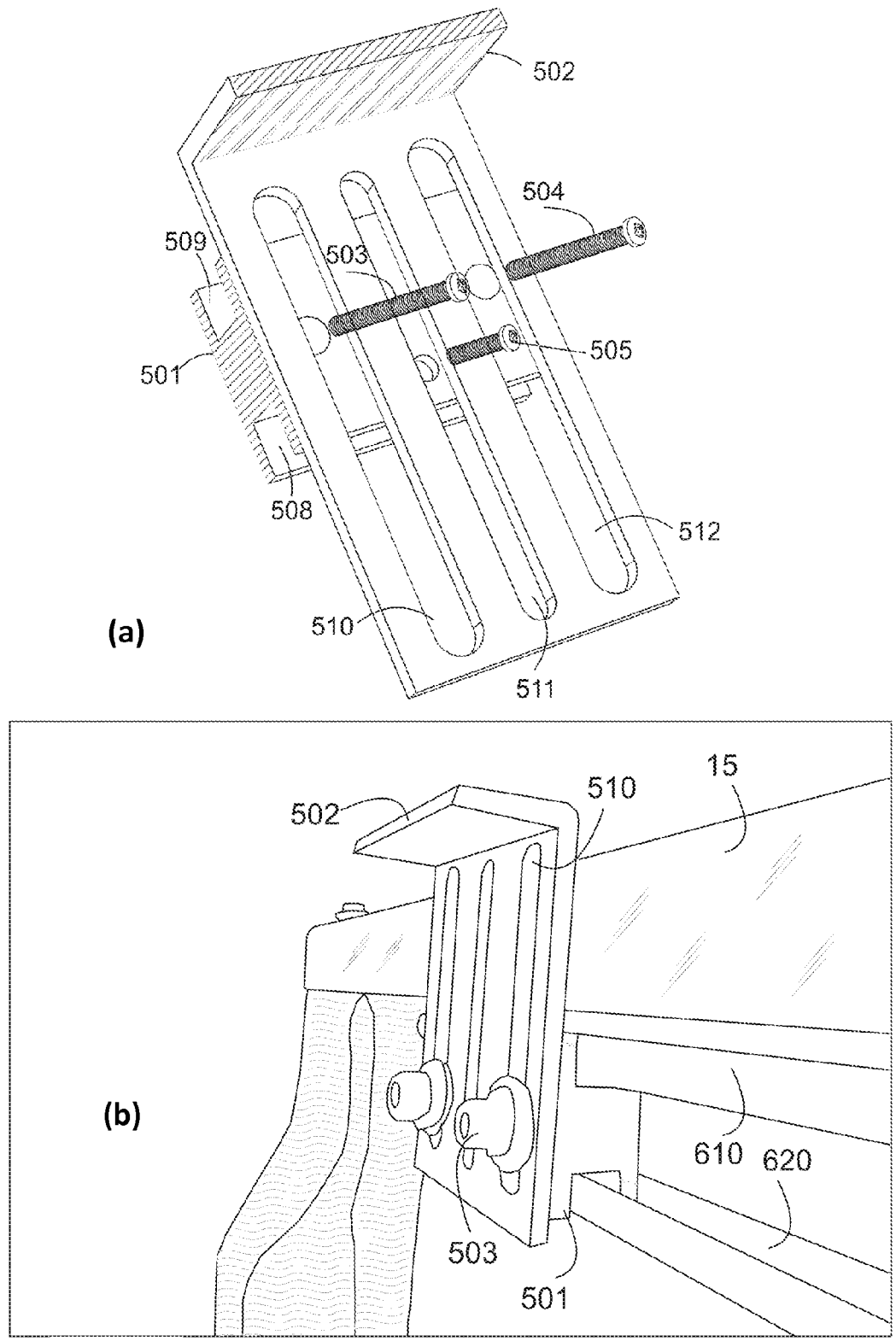
FIG. 8 shows an adjustable L-shaped holding bracket to adjustably engage to the railing of a truck bed from one side and to the latching mechanism form the other side.

In another embodiment, the L-shaped bracket is designed to attach to the railing on the truck bed walls, as shown in FIG. 8. This bracket does not require clamps 303 to connect the bracket to the truck bed. However, it required railings 610, 620 on the truck bed to attach on. The adjustable L-shaped metal bracket comprises of two parts: the railing element 501, and the L-shaped element 502. Three slots 510, 511, 512 are provided in the L-shaped element 502 for adjusting the height of the bracket with respect to the latching system. The railing element 501, can be attached onto the preinstalled rails in pickup trucks using the two opening 508 and 509. Two screws 503, 504 hold the L-shaped element 502 and the railing element 501 together and the small screw 505 holds the railing element 501 to the pick-up truck bed.

The two support frames 205, 206 help the latch 201 to adjust in a right place for opening and closing the panel. The position of locking system 200 on the cross bar 64, can be adjusted with two screws 311. For better access, spool 103 navigates the cable 105 to the rear of the tonneau cover. A screw 401 and covers 402, 403 set the spool 103 in place on the cross bar 64.

FIGS. 7(a) and 7(b) show schematic views of the latching device in open and close position. For closing the cover, the user applies a downward pressure onto the cover. The curved section of the spring-loaded catch 201 is pressed by the L-shaped metal bracket 301, pushing the catch slightly backward until the catch passes the bracket. Then the catch is forced by the spring to the locking position. To open the cover, the cable handle 106 is pushed down by the user.

In order to install the tonneau cover, the cover is set on the front of the truck bed and aligned on both sides. The front clamps are generally locked in one of three away positions. Clamps are pulled out from the away position and are held down and aligned with the truck railings. If there is a need, the clamps have to be moved to a different location on the base to make sure that they can catch the railing. This allows to clamp to stay parallel with the bed rail of the truck and, therefore, it never moves. Once aligned, the adjustment knob is turned until the clamp jaws are snug under the railings. Next the cover is opened by unbuckling the belt buckles on the cover. The cover is fully opened and the location of the latched with respect to the bed walls are identified. Then the L-shaped brackets are clamped on the bed walls in an aligned position with respect to the rear latched. The location of the latched may need to be adjusted to fit the specific bed size. Once the latches are installed, the tonneau cover can be installed by simply pushing down the rear side of the cover. To open the cover, first the tail gate is opened and the user reaches under the cover and pulls down the release cable. Therefore, the present tonneau cover requires one cable pull to open and one push from each side to close.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A tonneau cover for the bed of a pickup truck having a front-end-wall, a tailgate, a right and a left side walls, said cover comprising:
   a. a folding frame sized to cover the bed of a pickup truck, said frame having a front-beam, a rear-beam, a right-beam and a left-beam, whereby said front-beam lays on the front-end-wall, said rear-beam lays on the tailgate, said right-beam lays on the right wall, and said left-beam lays on the left wall;
   b. multiplicity of cross beams connecting the left-beam to the right-beam to provide rigidity and utility, and wherein a front-cross-beam being parallel with and having a prescribed distance from said front-beam beam, and a rear-cross-beam being parallel with and having a prescribed distance from said rear-beam;
   c. said front-cross-beam having a left end being engaged with said left-beam and a right end being engaged with said right-beam;
   d. said rear-cross-beam having a left end being engaged with said left-beam and a right end being engaged with said right-beam, a central section;
   e. a soft cover extending over said frame;
   f. a set of adjustable front-locking means attached onto said left end and said right end of said front-cross-beam;
   g. a set of rear-latching mechanism comprising,
      i. a set of latches attached onto said left end and said right end of said rear-cross-beam, each said latches having a catch and a releasing-tongue to release the catch of the latch upon pulling;
      ii. a set of cables, a cable-handle, and multiplicity of guiding-spools, wherein one end of each said cable being attached to the latch releasing-tongue and the other end of each said cable being attached to one end of said cable-handle;
      iii. said guiding-spools being installed in said central section of said rear-cross-beam, whereby said guiding-spools guide said each cable along the rear-cross-beam from the latch releasing-tongue to the central section of the rear-cross-beam and then towards the cable-handle;
      iv. said cable handle having two ends, one end of said cable handle being attached to the center of said rear-beam, and the other end of the cable handle being connected to said set of cables; and
      v. a set of bracket means installed onto the truck bed side walls to engage with the catch of each said latch to lock in the cover,
   whereby all said latches can be released at the same time by pulling said cable handle.

2. The tonneau cover of claim 1 for a pickup truck having railings adjacent to a cargo bay, wherein said adjustable front-locking means comprising,
   a. a substantially rectangular base, wherein said base having a longitudinal channel and multiplicity of crosswise channels forming multiplicity of crosses with the longitudinal channel;
   b. a hook shape clamp having a knob to tighten and loosen the clamp under said railing of the bed side-walls;
   c. a shank screw having two ends, one end screwed into said clamp and the other end rotatably attached to one of said crosses on said base;
   whereby the position of the clamp can be set in any one of the cross-wide channels to adjust the clamp to fit to a pickup truck bed.

3. The tonneau cover of claim 1, wherein said right-beam and said left-beam each having at least two hinges to provide a tri-folding cover.

4. The tonneau cover of claim 1, wherein said bracket means being a L-shape bracket having a height, wherein its long side being attached to said truck wall with C-clamp means and its short side engaging with the catch of each said latch.

5. The tonneau cover of claim 1 to be installed on a pickup truck bed having a preinstalled wall-track, said wall-track being two elongated rails with specific distance embodied into the pickup truck bed, wherein said wall-track having a length, wherein said bracket means comprising,
- a. a track-adaptor-bracket adapted to fit inside said preinstalled wall-track on said side-walls of said bed, whereby said track-adaptor bracket can slide along the length of said wall-track and be fixed at a location adapted to receive said rear-latching mechanism; and
- b. an L-shaped latch adjustment guide having a longer length and a shorter length, wherein said longer length having a latch-track-adjustment means, to adjust the height of the bracket with respect to said latches, and whereby the catch of each said latch locks under the shorter length.

* * * * *